(12) United States Patent
Presley

(10) Patent No.: US 6,212,316 B1
(45) Date of Patent: Apr. 3, 2001

(54) STAND-OFF MATCHED INDEX OPTICAL WAVEGUIDE INTERFACE

(76) Inventor: Harry Wayne Presley, 1315 Oak Harbor La., Malabar, FL (US) 32950

( * ) Notice: Subject to any disclaimer, the term of this patent is extended or adjusted under 35 U.S.C. 154(b) by 0 days.

(21) Appl. No.: 09/174,630

(22) Filed: Oct. 14, 1998

(51) Int. Cl.$^7$ ..................................................... G02B 6/26
(52) U.S. Cl. .................................................. 385/31; 385/1
(58) Field of Search .............................. 385/15, 31–34, 385/46, 27, 39

(56) References Cited

U.S. PATENT DOCUMENTS

| | | | |
|---|---|---|---|
| 4,153,331 | * 5/1979 | Cross | 350/96.2 |
| 4,732,450 | * 3/1988 | Lee | 350/96.18 |
| 4,783,137 | * 11/1988 | Kosman et al. | 350/96.16 |
| 4,872,180 | * 10/1989 | Rideout et al. | 372/99 |
| 5,892,868 | * 4/1999 | Peck, Jr. et al. | 385/34 |

* cited by examiner

*Primary Examiner*—Frank G. Font
*Assistant Examiner*—Layla Lauchman
(74) *Attorney, Agent, or Firm*—Dennis L. Cook

(57) ABSTRACT

The Stand-Off Matched Index optical interface reduces optical reflections thereby increasing return losses that occur when an optical waveguide, including optical fiber, is interfaced to a bulk media of significantly differing refractive index. A small spacer material, or stand-off, is placed between the waveguide and the media. The stand-off is index-matched to the waveguide thereby eliminating reflections from this interface. The length of the stand-off is chosen so the reflections from the stand-off/media interface are weakly coupled back to the waveguide due to diffraction and attenuation losses within the stand-off. This invention can be used in most situations where an optical fiber must be interfaced to a material of significantly different refractive index and is applicable to both multi-mode and single-mode fibers. And, it is generally applicable to any focal plane in an optical system that coincides with a refractive index discontinuity which results in troublesome back reflections. The general Stand-off Matched Index approach is also extendible to waveguides other than fibers, and even unguided light beams, independent of wavelength.

2 Claims, 1 Drawing Sheet

STAND-OFF MATCHED INDEX OPTICAL WAVEGUIDE INTERFACE

FIELD OF THE INVENTION

The present invention is an improvement in the field of fiber optics and more specifically it is a generic device for achieving low reflection fiber optic interfaces. This invention reduces troublesome optical reflections that occur when an optical waveguide (including optical fibers) is interfaced to a bulk media of significantly differing refractive index.

BACKGROUND OF THE INVENTION

Methods of interfacing to match fiber optic waveguides of differing refractive indexes is well known in the art but the typical mechanically angled optical interface has many complications associated with their use. Along with effecting wavelength and polarization they are difficult to fabricate, hard to align, and generate transmission losses. This invention uses a simple 90 degree interface with a stand-off and avoids these problems.

Reflections in fiberoptic systems degrade performance. They can lead to temporal dispersion, background noise, losses, crosstalk, laser instabilities and other problems. Reflections can arise from many sources such as switch and device interfaces, receiver termination, and other connections. Reflection requirements are becoming more and more demanding given such products as dense LAN's and test equipment. Return loss is one of the most important specifications in many optical devices. Traditional fixes are relatively complex and expensive. For example, a large refractive index discontinuity occurs between a fiber and a gradient index (GRIN) lens. This discontinuity can create a return loss of 30 dB. The standard industry method to fix this problem is to angle both the fiber and the GRIN lens. This can create a return loss of greater the 50 dB. Using the approach of this invention with parts that are easy to fabricate and assemble return losses of greater then 40 dB can be achieved.

SUMMARY OF THE INVENTION

The present invention has been made to solve the problems described above. It reduces optical reflections thereby increasing return losses that occur when an optical waveguide, including optical fibers, is interfaced to a bulk media of significantly differing refractive index. A small spacer material, or stand-off, is placed between the waveguide and the media. The stand-off is index-matched to the waveguide thereby eliminating reflections from this interface. The length of the stand-off is chosen so the reflections from the stand-off/media interface are weakly coupled back to the waveguide due to diffraction and attenuation losses within the stand-off. This invention can be used in most situations where an optical fiber must be interfaced to a material of significantly different refractive index and is applicable to both multi-mode and single-mode fibers. And, it is generally applicable to any focal plane in an optical system that coincides with a refractive index discontinuity which results in troublesome back reflections. The general Stand-off Matched Index approach is also extendible to waveguides other than fibers, and even unguided light beams, independent of wavelength.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
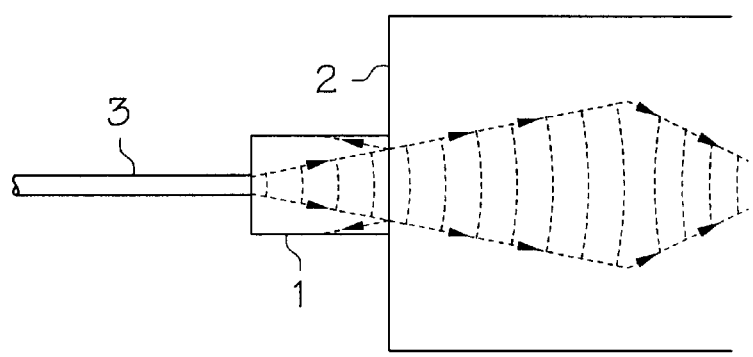
FIG. 1 is a block diagram showing the basic configuration of the Stand-Off Matched Index optical waveguide interface in its preferred embodiment.

Optical fibers are commonly interfaced to gradient index (GRIN) lenses for products such as switches, collimators, receivers, etc. FIG. 1. shows such an interface with the Stand-Off Matched Index interface used. Instead of simply end-butting and epoxying the fiber (3) to the GRIN lens (2) a silica stand-off (1) is inserted between them so that the fiber (3) is epoxied to the stand-off (1) and the other side of the stand-off (1) is epoxied to the GRIN lens (2). There are two key components in this embodiment: 1) silica was chosen as the stand-off (1) material since it has nearly the same refractive index as the core of the fiber (3), thereby minimizing the reflection from the fiber (3)/stand-off (1) interface (the closer the match in index the less reflections are produced), and, 2) the relatively large reflection that occurs at the stand-off (1)/GRIN (2) interface is displaced far enough from the end of the fiber (3) so that, because of diffraction spreading, very little of the reflected energy couples back into the fiber (3). The thickness of the stand-off can be tailored to provide the desired degree of reflective isolation. The epoxy used between the fiber (3) and the stand-off (1) should ideally have a refractive index that is the square root of the product of the stand-off's (1) index and the fiber's (3) index, although anything near the average of the two will suffice. The refractive index of the epoxy used between the stand-off (1) and the GRIN lens (2) should be computed in a similar manner.

Figure 2:
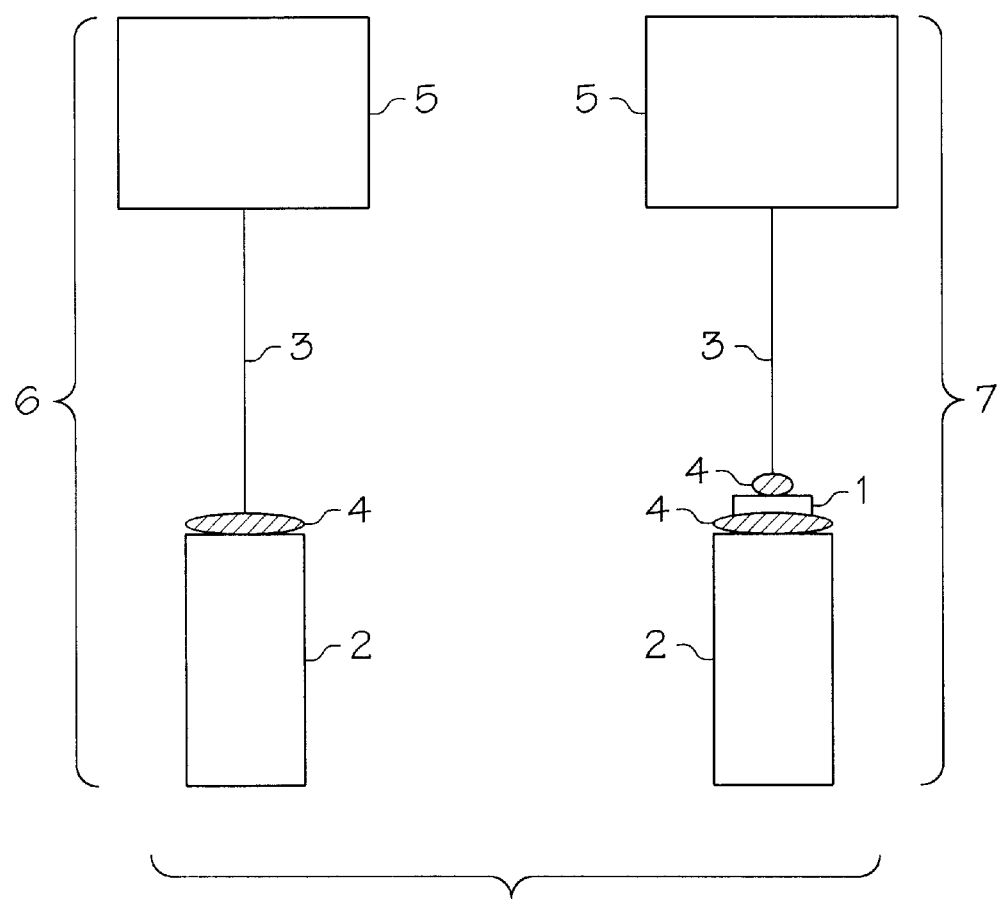
FIG. 2 shows the test configuration used to confirm the increase in return loss using the Stand-Off Matched Index optical waveguide interface.

The Stand-Off Matched-Index optical waveguide interface of the present invention can be used in many applications where a significant difference in refractive indexes of the connecting devices occurs and a large return loss is required. To demonstrate the effectiveness of this device FIG. 2 shows comparison test configurations (6 & 7) used to confirm the increased return loss when the embodiment of FIG. 1 is used. A precision reflectometer (5) such as a Hewlett-Packard 8504B can be used to measure the strength of reflections back into the fiber (3) occurring at the fiber (3)/GRIN lens (2) interface in standard configuration (6) and similar measurements were taken using a stand-off (1) between the fiber (3)/GRIN lens (2) in stand-off configuration (7). The optical wavelength chosen was 1550 nm. In normal configuration (6) the fiber (3) was bonded directly to the GRIN lens (2) using Epo-Tek OG134 epoxy (4), a common refractive index matching epoxy produced by Epoxy Technology, Inc. and well known to those skilled in the art. The GRIN lens (2) was a stock lens from Nippon Sheet Glass Company, Ltd. The reflection at the interface measured −29.5 dB. In the stand-off configuration (7) also shown in FIG. 2 a highly polished fused silica spacer of 1.0 mm thickness (the stand-off (2)) was first bonded to the GRIN lens (2) with OG134 epoxy (4), and then the fiber (3) was bonded to the stand-off (1) with OG134 epoxy (4). OG134 epoxy was chosen because it provides a close index match to both the silica stand-off (1) and the fiber (3). In this stand-off configuration (7) the reflection measured −44.7 dB, for an improvement of over 15 dB. This equates to a 97% reduction in the reflected light.

Significantly, the transmitted light is attenuated by only 1–2% by the addition of the Stand-Off Matched Index optical waveguide interface. Also, the reflected and transmitted light properties are virtually unaffected by wavelength and polarization effects that often occur in other interface methods. Depending on the specific application the stand-off (1) can be made thicker than the 1.0 mm disclosed here to supply even more reflection loss.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the dependent claims.

That which is claimed:

1. An optical interface device between a waveguide and a bulk media that reduces optical reflections and thereby increases return loses when an optical waveguide is interfaced to a bulk media of significantly differing refractive index comprising:

a stand-off, said stand-off having an index closely matched to said optical waveguide, said stand-off being placed between said optical waveguide and said bulk media, said stand-off having a larger cross-sectional area than said optical waveguide, said stand-off abutting against said bulk media;

said optical waveguide being aligned toward said stand-off; and said stand-off having a minimum length sufficient to be capable of generating diffraction and attenuation losses within said stand-off to reduce the optical reflections coupled back to said waveguide from the interface between said stand-off and said bulk media.

2. An optical interface between an optical waveguide and a bulk media as claimed in claim 1 wherein said optical waveguide is abutting against said stand-off.

* * * * *